United States Patent
Orsic

Patent Number: 6,147,986
Date of Patent: Nov. 14, 2000

[54] ADDRESS UPDATING OF WIRELESS MOBILE TERMINAL HOSTS AFFILIATED WITH A WIRED NETWORK

[75] Inventor: Milo Orsic, Lincolnwood, Ill.

[73] Assignee: Lucent Technologies Inc., Murray Hill, N.J.

[21] Appl. No.: 09/036,339

[22] Filed: Mar. 6, 1998

[51] Int. Cl.[7] .................................................. H04J 3/24
[52] U.S. Cl. ...................................... 370/349; 370/331
[58] Field of Search .................................. 370/349, 312, 370/428, 313, 351, 256, 408, 234, 235, 255; 455/575; 716/18; 704/254, 215, 233

[56] References Cited

U.S. PATENT DOCUMENTS 5,652,751   7/1997   Sharony.

Primary Examiner—Wellington Chin
Assistant Examiner—Prenell Jones
Attorney, Agent, or Firm—Law Office of Leo Zucker

[57] ABSTRACT

A method of defining an address for a mobile terminal host (T/H) linked to a wired communications network, e.g, the global Internet. The method includes assigning an address to the mobile (T/H), the address corresponding in part to a first network base station to which the mobile T/H becomes linked, for example, by roaming into a cell of the base station. The address assigned to the mobile T/H is changed when the T/H roams and becomes linked to a second network base station, the changed address corresponding in part to the address of the second base station. At least one stationary terminal host in the network is informed of a current address assigned to the mobile T/H by establishing a connection between the mobile T/H and the stationary host. Message data is exchanged between the mobile and the stationary hosts as long as a connection is maintained between them.

12 Claims, 4 Drawing Sheets

ADDRESS UPDATING OF WIRELESS MOBILE TERMINAL HOSTS AFFILIATED WITH A WIRED NETWORK

BACKGROUND OF THE INVENTION

1. Field of the Invention

The present invention relates generally to methods of addressing data packets destined to a host in a communications network, and particularly to a method of defining an address for a mobile terminal/host while it is linked with the network via network base station cells.

2. Discussion of the Known Art

A known method of routing messages to wireless mobile terminal/hosts (T/Hs) that access the Internet via network base station cells, involves assigning only one unique Internet Protocol (IP) address for each mobile T/H. All traffic destined to a mobile T/H is thus addressed and transmitted to one site address for the mobile T/H. A home agent or "proxy" is located at the site of the IP address, and forwards the traffic to the mobile T/H. The latter continuously informs the site address of its present location. Thus, a messaging protocol is needed between the mobile T/H and the proxy at the T/H's fixed IP site address, to ensure that the proxy always has an updated forwarding address for the mobile T/H.

There are two problems with the known forwarding method. First, the mentioned mobile IP messaging must be incorporated into the Internet. Hence, all routers with which the mobile T/H connects must be able to support such mobility management. Second, traffic destined to the mobile T/H is always transmitted to the site of the T/H's fixed IP address, regardless of the actual location of the mobile T/H at any moment. This results in wasted bandwidth and additional delay that may be unacceptable when, for example, transmitting real-time data such as audio, video, simulation data or the like. See also U.S. Pat. No. 5,652,751 (Jul. 29, 1997) which relates to message routing schemes for wireless mobile networks having dynamically changing topologies.

SUMMARY OF THE INVENTION

According to the invention, a method of defining an address for a mobile terminal/host (T/H) linked to a wired communications network, includes assigning an address to a mobile (T/H) affiliated with a wired communications network, the address corresponding in part to a first network base station with which the mobile T/H becomes linked, changing the address assigned to the mobile T/H when the mobile T/H becomes linked with a second network base station, the changed address corresponding in part to an address of the second base station, and informing at least one stationary terminal host in the network of a current address assigned to the mobile T/H by establishing a connection between the mobile T/H and the stationary terminal host.

For a better understanding of the invention, reference is made to the following description taken in conjunction with the accompanying drawing and the appended claims.

DETAILED DESCRIPTION OF THE INVENTION

Figure 1:
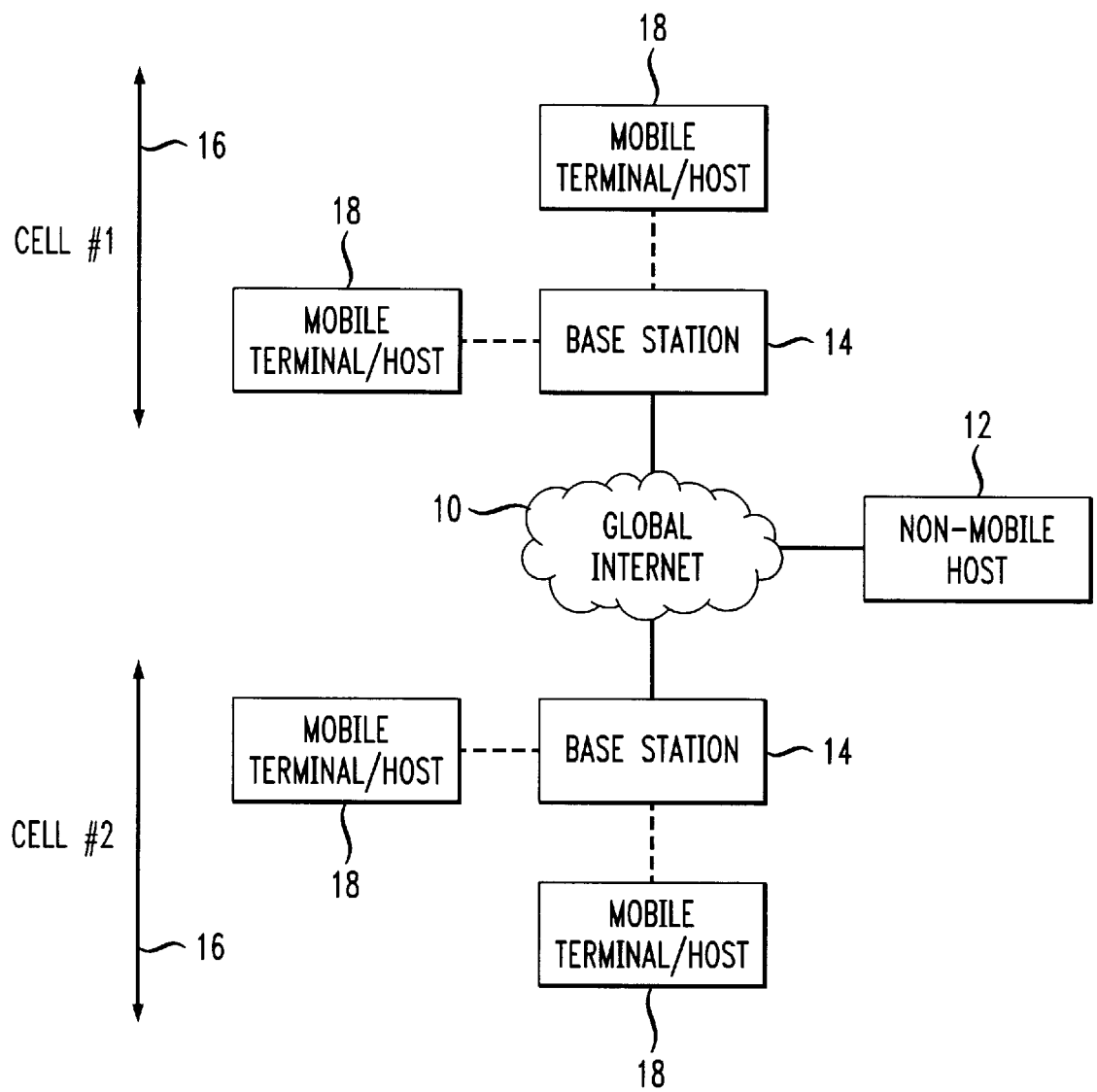
FIG. 1 is a schematic representation of a wired network with base stations for linking a number of roaming mobile terminal/hosts.

FIG. 1 shows a schematic representation of a wired network 10, for example, the Global Internet. The network 10 links fixed, i.e., stationary terminal host (H) users 12 and a number of network base stations (BS) 14 with one another. Each of the base stations 14 has an associated cell 16 within which one or more mobile terminal/hosts (T/H) 18 may enter to establish a wireless link with the base station, and, thus, gain access to the wired network 10.

Figure 2:
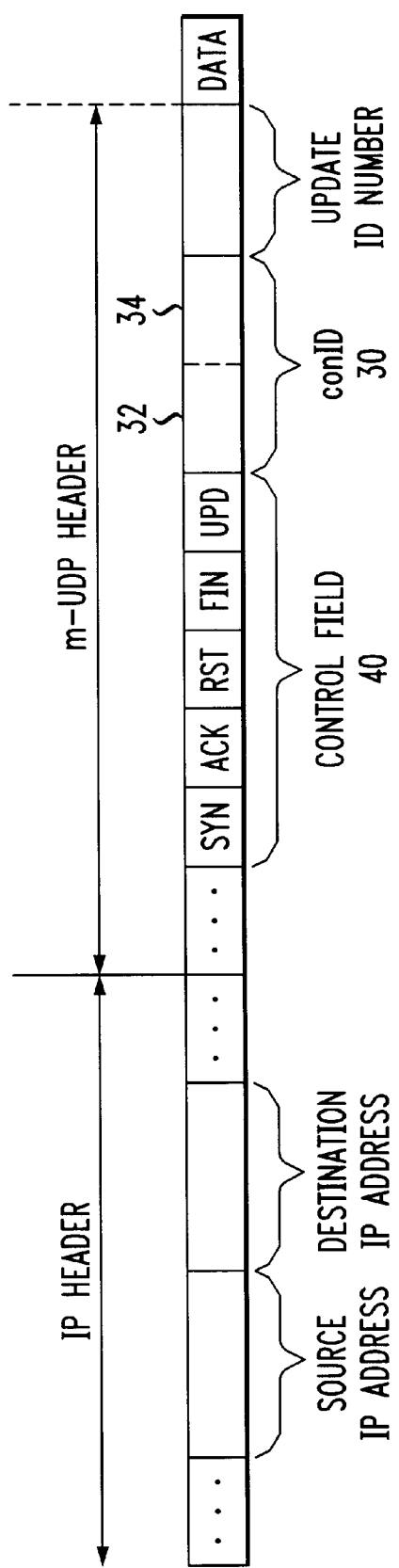
FIG. 2 shows a data packet header according to the invention.

A protocol known as UDP (User Datagram Protocol) is currently employed in the Internet for routing and delivering message packets called "datagrams", based exclusively on a datagram's destination endpoint address (i.e., IP address and protocol port). That is, currently, UDP is "connectionless" in that message packets are transmitted from a source to a destination without any connection having first been established between the two entities. According to the invention, the IP address of each mobile T/H 18 changes each time the T/H enters a different base station cell 16, and data packets or "datagrams" are routed to the mobile T/H according to a most recent IP address using a data header format explained below in connection with FIG. 2. The scheme of the invention is "connection-oriented" in that message packets in the format of FIG. 2 are exchanged between a mobile and a stationary host only after (a) the two entities acknowledge a connection between them, (b) the stationary host is informed of a current address for the mobile T/H, and (c) the connection remains up. Also, the stationary host is updated by the mobile T/H of any address change for the latter while the connection lasts, using endpoint update datagrams with formats explained below in connection with FIGS. 4 and 5.

Referred to herein as mobile UDP or "m-UDP", the present invention contemplates the opening and closing of duplex m-UDP connections between communicating (peer) m-UDP entities, viz., mobile and stationary hosts equipped to communicate with one another across the Internet. Each mobile m-UDP entity or T/H 18 continuously informs peer stationary m-UDP entities or hosts 12 of the former's current IP address as it roams from cell 16 to cell. Thus, each source (stationary) host 12 may send a m-UDP datagram directly to a mobile T/H 18 over an optimal route, rather than to a fixed location where a "home agent" relays the datagram to the T/H. 18. The present scheme executes exclusively in the mobile and stationary hosts, rather than becoming part of the network 10. That is, the scheme is external to the network 10.

Like the existing UDP service, m-UDP preferably retains checksumming of data and multiplexing by port number. If required, a higher layer, e.g., Real Time Protocol (RTP) running over a m-UDP connection can deal with communication problems such as flow control, re-transmission, segmentation and the like. The mobile T/H IP address identifies its point of attachment to the network 10. In addition, a dynamic domain name server (DNS) is assigned for the mobile T/H and is continuously informed of the mobile's current IP address to ensure proper routing of messages when the mobile's domain name is being used in an address. Using conventional protocols, the mobile's DNS is informed of the current IP address either by a base station into whose cell the mobile T/H has roamed, or by the mobile T/H itself. Thus, applications distributed across the Internet are able to initiate new m-UDP connections between stationary hosts and mobile T/Hs.

As mentioned, FIG. 1 shows the Global Internet 10 and a number of base station cells 16 which together define a wireless access Internet. One Base Station (BS) 14 is allocated to each cell 16, and each BS provides radio access for the mobile terminal/hosts 18. For example, one or more high capacity upstream and downstream radio channels may be allocated to each cell 16.

It is further assumed that each mobile T/H 18 is capable of simultaneously communicating with two base stations 14. That is, two duplex radio channel pairs are available to provide each mobile T/H 18 with two different routes to the Global Internet which routes pass through two corresponding base stations 14. As described later below, when either end of a m-UDP connection sends a datagram (FIG. 2), the datagram is sent over only one of the available routes.

With respect to IP traffic, each BS 14 is viewed as a router that connects a wireless access sub-network (i.e., a cell 16) to the Global Internet. Each cell 16 has its own IP address, referred to as "netid". According to the invention, each wireless mobile T/H 18 acquires a new address, i.e., a combination of a base station address ("netid") and the T/H's own "hostid", as it moves from one base station cell 16 to another. Thus, the network or IP address for the mobile T/H 18 is comprised of (netid, hostid). In addition, when a mobile T/H detaches itself from an "old" base station, the T/H relinquishes its old IP address. The attaching and detaching of a mobile T/H 18 to and from the base stations 14 is referred to herein as "hand-off". When a mobile T/H 18 links itself to a new BS 14 while still being linked to a prior base station, the process is referred to as a "soft" hand-off. A soft hand-off has the advantage that when a mobile T/H 18 links itself to a new BS 14, it is still able to receive datagrams over the old route. Therefore, all datagrams pipelined in the network 10 and destined to the mobile T/H are still delivered to the T/H over the prior route, and no datagrams are lost. The duration of a soft hand-off should preferably exceed the maximum time an old datagram can remain alive in the network 10, when traveling the prior route.

Necessary modifications to existing Internet protocols, and new functions to be incorporated in the present m-UDP scheme, are now discussed. It is assumed that a mobile T/H 18 communicates with a stationary host 12 that resides at a fixed Internet location. Each mobile T/H 18 is given a permanent assigned domain name which stays fixed regardless of the mobile's current IP address. Its domain name is always known to the mobile T/H, and is stored, e.g., in the mobile T/H's non-volatile memory. In addition, the name is registered with the mobile's domain name server.

A new class of domain names, referred to herein as a "Mobile Internet Class", is defined for the DNS. Thus, when a resolver in the network requests a name resolution for a mobile T/H from the mobile's DNS, the resolver is informed that a given name pertains to a Mobile Internet Class terminal host. Preferably, no temporary storage or "caching" of domain names is permitted for this class of names. Name resolution is allowed only by the DNS which serves the mobile T/H 18. This information is used to determine whether or not to use a m-UDP protocol. As disclosed, the m-UDP protocol of the invention executes on top of the standard IP layer. A new IP protocol port number is allocated to the m-UDP layer, however. This enables the IP layer to deliver an incoming datagram to the proper protocol port (i.e., to m-UDP).

As mentioned earlier, when a mobile terminal/host 18 roams and acquires new IP addresses, its DNS server is informed of the new address either by the mobile T/H or the associated base stations. During a soft hand-off, the mobile T/H's DNS server will always have a "latest" IP address. Further, whenever a mobile T/H disconnects itself (e.g., the T/H is powered down), it's DNS server will not acquire any IP address that is bound to the respective T/H's domain name. Any request for name resolution then will result in an error message from the mobile T/H's DNS server. Hosts at fixed Internet locations that access the mobile T/H's DNS server will then access the server via a standard Internet mechanism, i.e., either TCP (Transport Control Protocol)/IP or UDP/IP stacks.

As the mobile T/H 18 changes its point of linking to the wired network 10, it is informed which DNS server provides name resolution services for a present cell 16. The identified DNS server uses the m-UDP/IP stack and has a new m-UDP port for access from the mobile T/H's. A modified dynamic host configuration protocol ("m-DHCP") allocates IP addresses to the roaming mobile T/H's. Each base station 14 preferably incorporates the m-DHCP server functions. The m-DHCP client executes in the mobile T/H 18, while the m-DHCP server executes in the base station 14. The m-DHCP in the mobile T/H 18 and BS 14 executes on top of a standard UDP/IP stack. The exchange of m-DHCP request/response information should be sufficiently fast to occur while a mobile T/H 18 remains located in a given cell 16. Otherwise, the procedure may fail and must be repeated in a new cell.

A pool of IP addresses allocated to each BS 14 is preferably larger than the maximum number of mobile T/H's 18 presently located in the corresponding cell 16. Further, whenever an IP address is returned to the available pool, it is "retired" for a certain time to avoid having datagrams from a previous connection interfering with a current one. Ideally, such a retirement period is typically larger than the maximum time an old datagram can remain alive in the Internet.

When a mobile T/H 18 initially links itself to the Internet, or is handed off from an old to a new base station 14, it obtains a new IP address via the radio sub-network handled by the respective BS 14. As mentioned, the T/H 18 creates a m-DHCP request message and sends it to the m-DHCP server in the BS 14. The request message includes the T/H's domain name and a unique hardware address. In its response, the m-DHCP server indicates which IP address has been leased to the mobile T/H 18. In addition, the server specifies the duration of the lease, the BS's IP address (i.e., the address of the router for the wireless sub-network), and the IP address of the DNS server that serves the wireless sub-network. The m-DHCP server also informs the dynamic DNS server for the mobile T/H when an IP address is allocated to the T/H, and when the allocated IP address has been canceled. The m-DHCP will know the DNS server for the mobile T/H 18 because the latter supplies its domain name in its m-DHCP request message.

There are two variables for a mobile T/H 18, namely, a current IP address and a previous IP address, to indicate the T/H's two most recent addresses. As described below, the mobile T/H 18 uses the current IP address variable as the current source IP address when sending a datagram over the Internet. For incoming datagrams, they are accepted by the mobile T/H 18, if the destination IP address corresponds to either the current or the previous IP address.

The existing UDP allows an application program on a given T/H 18 to send datagrams to peers across the Internet. The UDP employs a protocol port mechanism to distinguish among multiple applications executing on the same machine. It is almost a null protocol; it does not use acknowledgments, it does not order incoming datagrams, and it does not provide flow control. It routes and delivers datagrams based exclusively on a given destination endpoint address (i.e., IP address and protocol port). In the present invention, the endpoint addresses (i.e., IP addresses) of mobile T/Hs are constantly changing, however. It is therefore impossible to route a datagram reliably based on a fixed destination IP address for a mobile T/H 18. A new mechanism is therefore employed to inform stationary hosts continuously about new IP addresses that a mobile T/H 18 will be acquiring.

Because it is impossible to inform all potential sources about address changes for a given mobile T/H 18, it is necessary to establish a "relation" (i.e., a connection) between a mobile T/H 18 and only those sources that intend to communicate with the mobile T/H 18. This provides a mechanism that enables each mobile T/H 18 to inform only relevant sources of any changes in the mobile's IP address.

There are two scenarios concerning how a m-UDP connection is established according to the invention. In the first, an application program running in a given mobile T/H 18 executes a passive open function, indicating to its m-UDP layer that it is willing to accept a connection on a specified m-UDP port number. A client program resident in a stationary (non-mobile) host 12 wants to establish a duplex m-UDP connection with a peer mobile T/H 18 and executes an active open function. Before the fixed host 12 executes the active open function, the program obtains a current IP address of the peer mobile T/H 18 from the mobile's DNS server. Subsequently, it sends a connection request to the mobile T/H. Meanwhile the mobile T/H 18 has changed its address, but the earlier mentioned soft hand-off mechanism insures that the connection request will reach the mobile T/H. In a connection-acknowledge response, the mobile T/H 18 includes its new IP address. If the old IP address has been relinquished before a request for connection arrives, the attempt to set up a connection fails and must be repeated. When repeating the setup procedure, the client program accesses the mobile T/H's DNS server again and then obtains the new IP address.

In the second scenario, an application program resident in the stationary host 12 indicates to the m-UDP layer that it will accept a connection on a specified m-UDP port number, by executing a standard passive open function. A client program resident in the mobile T/H 18 executes an active open function and specifies the IP address of the host 12 and the respective port number.

Preferably, a three-way handshake is used when establishing a m-UDP connection. A standard TCP three-way protocol is adopted to set and to close m-UDP connections. See FIGS. 4 and 5. Instead of using sequence numbers as are used in standard TCP, the m-UDP protocol of the invention exchanges two new parameters when making a m-UDP connection. The two parameters, "local connection identification" (local_conID) and "remote connection identification" (remote_conID), identify a m-UDP connection uniquely during its entire lifetime. For example, each side may choose a local_conID value at random. The chosen values are sent and acknowledged during the three-way handshake. A "connection identification" (conID) that uniquely identifies the m-UDP connection is defined as a two-tuple formed by local_conID and remote_conID, i.e., conID=(local_conID, remote_conID).

During the mentioned three-way handshake, each m-UDP side chooses a local_conID to identify its local side of the connection. Thus, a conID field 30 in each m-UDP header conveys identification information for the connection, including local_conID 32 and remote_conID 34. The conID field 30 is included in each subsequent m-UDP datagram, wherein the sender always includes its local_conID in the local-connection field 32, and its peer's local_conID (locally referred to as remote_conID) in the remote-connection field 34. See FIG. 2. The existing TCP three-way handshake is preferably configured to work even if both sides attempt to initiate a connection simultaneously, or if datagrams are lost, delayed, duplicated, or delivered out of sequence.

For standard TCP, any inconsistency during an exchange of initial sequence numbers may result in resetting the connection. For m-UDP, an exchange of conID values is handled the same as initial sequence numbers in a standard TCP connection setup procedure. That is, a m-UDP three-way handshake may be viewed as a TCP handshake that exchanges local_conID and remote_conID, rather than exchanging initial sequence numbers. The checksum for m-UDP is preferably computed over the entire header of FIG. 2, including the conID field 30.

A control field 40 is also included in the m-UDP healer. The control field 40 includes the following bits, shown in FIG. 2: SYN, ACK, RST, FIN and UPD. By definition, if all bit are "zero", the datagram carries user information and is not a "control" datagram according to the invention, such as described below.

The first m-UDP (control) datagram of a three-way handshake is identified by a SYN bit in the control field 40. The first m-UDP datagram requesting a setup of a m-UDP connection (e.g., SYN=1), contains only a local_conID value in the local-connection field 32. The remote-connection field 34 of the header is left blank.

A response header will have both the SYN and the ACK bits set (e.g., both=1), acknowledging the first SYN segment and continuing the handshake. The responder also includes its selected local_conID value in the local-connection field 32 of the m-UDP header. In the remote-connection field 34, the responder copies the local-connection field content from the incoming segment being acknowledged. A final handshake segment is only an acknowledgment, and informs the destination that both sides agree that a m-UDP connection has been established. The conID 30 therefore plays the same role as a sequence number in standard TCP.

Operation of the present m-UDP protocol during an "established" phase of a m-UDP connection, is preferably subdivided into lower and upper functional sublayers. The lower-sublayer is configured so that, when required, arriving datagrams are error free and have arrived at the proper endpoint. This is achieved by the IP layer passing to the m-UDP layer the source and the destination IP addresses, and the datagram itself. When required, the lower sublayer uses this information to calculate a checksum. For outgoing datagrams, the lower-sublayer creates a pseudo-header, computes the checksum, and passes the source and destination IP addresses and the m-UDP datagram to the IP layer.

The upper-sublayer performs an internal demultiplexing function. For each established m-UDP connection, the upper-sublayer has associated conID and endpoint information available. As the endpoints of the connections change, the m-UDP upper-sublayer must be informed. The local-endpoint information (i.e., local IP address) is recorded as a current IP address variable. The remote-endpoint information (i.e., remote IP address) is obtained from a newly defined type of datagram that is described below. For each m-UDP connection, higher-sublayer peers must exchange endpoint update datagrams.

Figure 3:
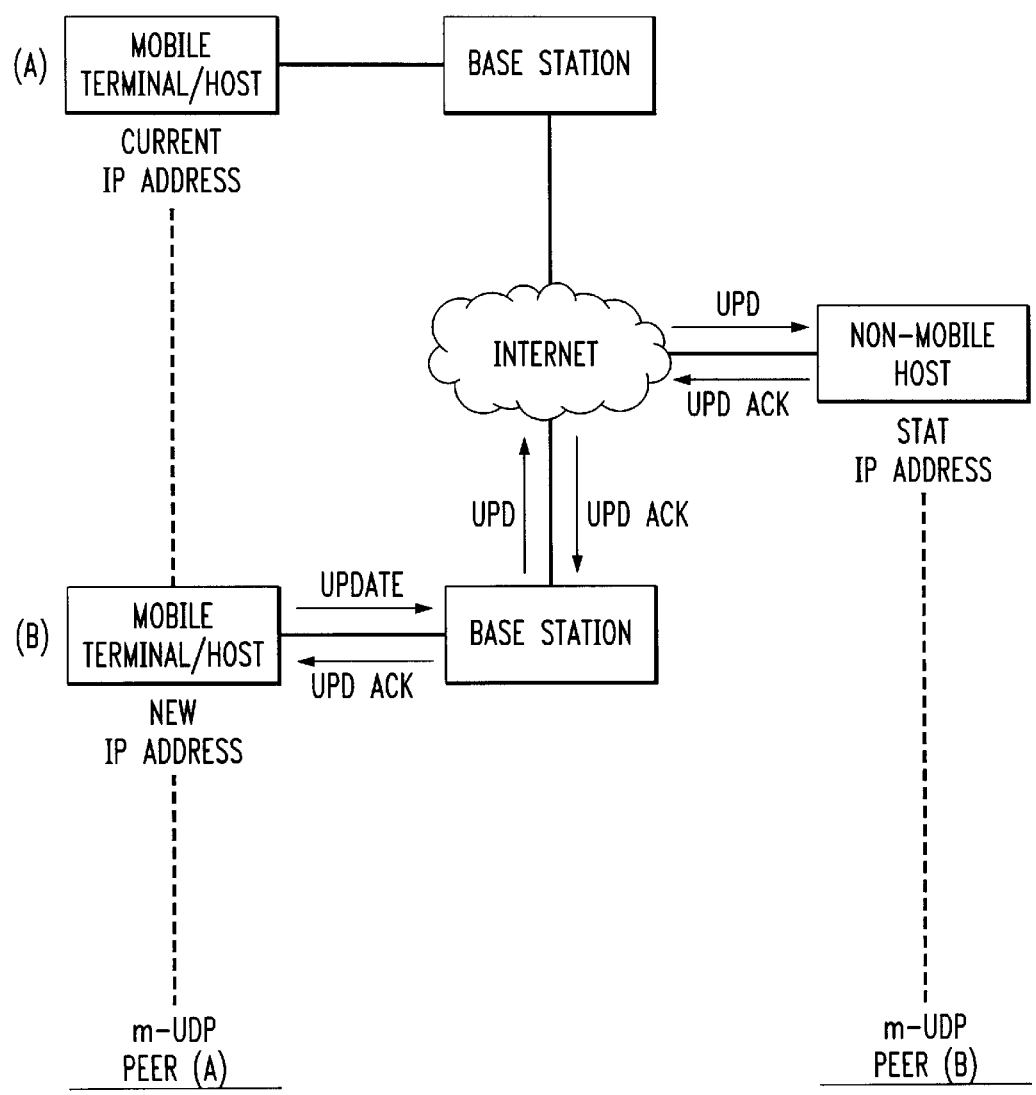
FIG. 3 is a schematic representation of a network similar to FIG. 1, illustrating a protocol for updating an address of a mobile terminal/host when linking with a different base station.
Figure 4:
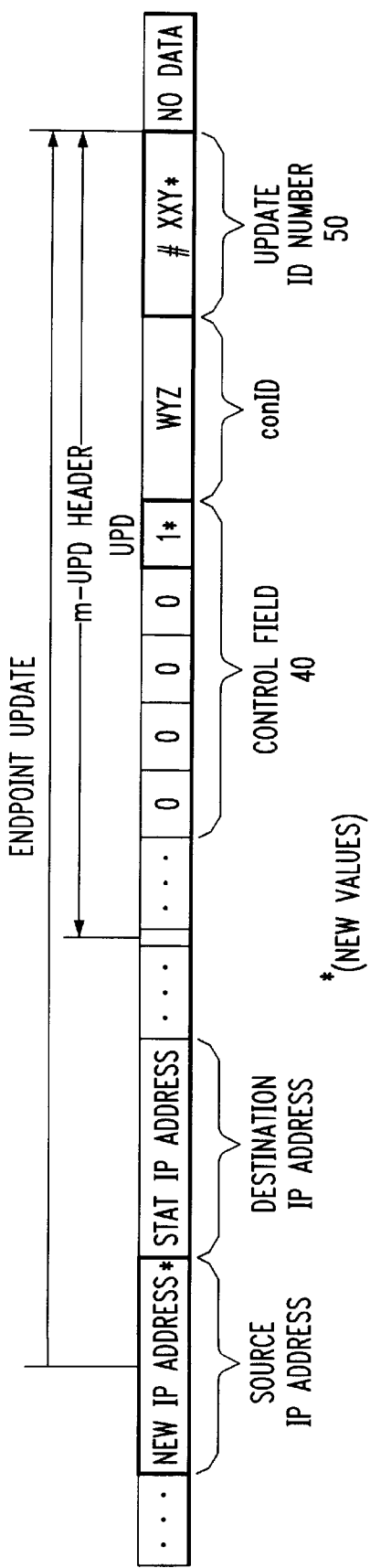
FIG. 4 shows an endpoint update datagram header according to the invention.
Figure 5:
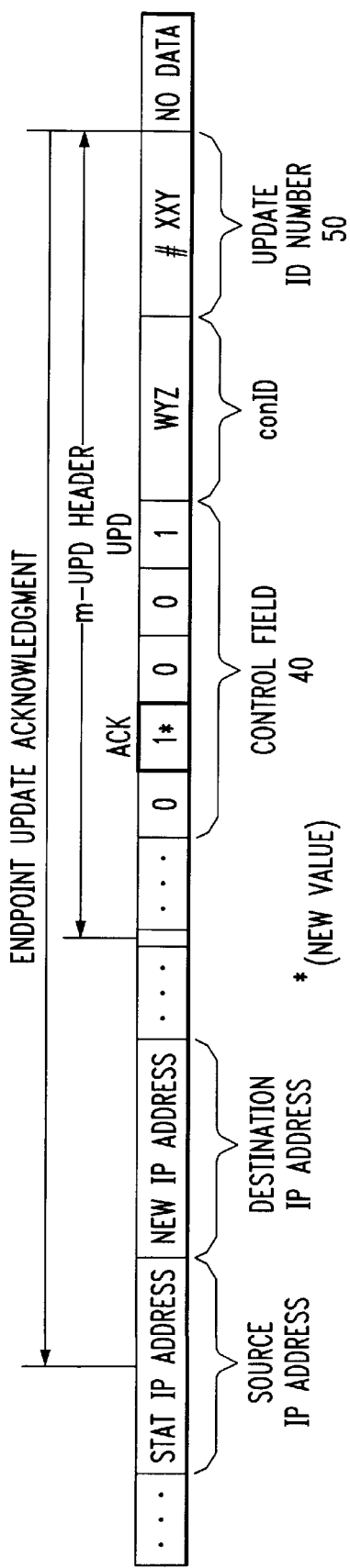
FIG. 5 shows an endpoint update acknowledgment datagram header according to the invention.

As shown in FIG. 3, whenever a mobile T/H 18 enters a new base station cell and obtains a new IP address, its m-UDP upper-sublayer sends an endpoint update datagram, shown in FIG. 4, to its stationary peer for each m-UDP connection. In addition, during the life of the m-UDP connection, the upper sublayer sends the endpoint update datagram of FIG. 4 to its peer at regular time intervals. The endpoint update datagram is acknowledged by the peer with an endpoint update acknowledgment datagram, shown in FIG. 5. The UPD bit in the m-UDP control field 40 labels the datagram as an endpoint update datagram. The endpoint update acknowledgment datagram of FIG. 5 has both the UPD and the ACK bits set. If an endpoint update datagram is not acknowledged, it should be re-transmitted.

Each endpoint update datagram also has an assigned identification number 50, seen in FIG. 4. The sender of an endpoint update datagram increments the identification number 50 for each subsequent endpoint update datagram it sends to its peer. The identification number 50 enables a receiver of an endpoint update datagram to ignore old endpoint update datagrams that may have been delayed in the network. The receiver includes the received identification number 50 in its endpoint update acknowledgment datagram (FIG. 5), thus indicating which endpoint update datagram it is confirming.

A three-way handshake is also used to close an established connection. Each side may close its half of the connection, using the control bits FIN and ACK in the m-UDP healer. Once a connection is closed in a given direction, no more user datagrams are accepted for that direction. Meanwhile, datagrams may continue to flow in the opposite direction until closed by the sender. The present scheme preferably employs procedures similar to those used in TCP when closing a connection.

Endpoint update (FIG. 4) and endpoint update acknowledgment (FIG. 5) datagrams are exchanged until a given m-UDP connection is closed (i.e., it reaches the closed state). Since IP addresses for mobile T/Hs 18 may change during the closing phase of a given connection, the endpoint update and the endpoint update acknowledgment datagrams should be exchanged in both directions until the connection is closed in both directions.

The reset (RST) bit of the control field 40 is used as in standard TCP. While a connection is in an established or "up" state, control bits are not used. A mobility management function for m-UDP connections is preferably embedded in the m-UDP upper sublayer. For each m-UDP connection, the upper-sublayer provides dynamic binding between the connection, and the endpoints of the connection. Incoming datagrams are routed to a proper m-UDP port based on their conID value. For outgoing datagrams, the upper-sublayer obtains current local and remote IP addresses and port numbers (which are not modified during a given connection), and passes them with the datagrams to the lower-sublayer. This mobility is transparent both to the user and to the Internet.

The present disclosure defines a new protocol, referred to as m-UDP, that supports mobility across the Internet and otherwise provides existing UDP-like service. The approach taken considers the entire network (Internet) to be a fixed network, and it is connection-oriented. Mobility management is external to the Internet, and is incorporated into a m-UDP/IP stack that executes in stationary hosts 12 and in mobile terminals/hosts 18, rather than being incorporated into the network 10 itself. Routing between two communicating entities is always optimal and cross-network delay is minimized, even when one of the entities is a roaming, wireless mobile T/H.

While the foregoing description represents a preferred embodiment of the invention, it will be obvious to those skilled in the art that various changes and modifications may be made without departing from the true spirit and scope of the invention pointed out by the following claims.

I claim:

1. A method of defining an address for a mobile terminal/host that is linked to a wired communications network, comprising:

assigning an address to a mobile terminal/host (T/H) affiliated with a wired communications network, the address corresponding in part to an address of a first network base station with which the mobile T/H becomes linked;

changing the address assigned to the mobile T/H when the mobile T/H becomes linked with a second network base station, the changed address corresponding in part to an address of the second network base station; and informing at least one stationary terminal host in the network of a current address assigned to the mobile T/H by establishing a connection between the mobile T/H and the stationary terminal host.

2. A method according to claim 1, wherein said informing step is performed by transmitting endpoint update data from the mobile T/H to a stationary terminal host, the endpoint update data containing said current address.

3. A method according to claim 2, including transmitting endpoint update acknowledgment data from the stationary terminal host to the mobile T/H after the stationary terminal host receives said current address from the mobile T/H.

4. The method of claim 3, including defining a control field in each of said endpoint update and said endpoint update acknowledgment data, and allocating in said control field a first bit indicative of a request from the mobile T/H for a setup of an address update connection.

5. The method of claim 4, including allocating in said control field a second bit indicative of an acknowledgment from a stationary terminal host of receipt of the first bit in the control field of an endpoint update data from the mobile T/H.

6. The method of claim 3, including defining a control field in each of said endpoint update and said endpoint update acknowledgment data, and allocating in said control field a third bit indicative of a request from a terminal host to close an established connection.

7. The method of claim 3, including defining a connection identification field in each of said endpoint update and said endpoint update acknowledgment data, and allocating in said field a local connection identification whose value is selected by a terminal host when transmitting said data.

8. The method of claim 7, including allocating in said connection identification field a remote connection identification whose value is selected to correspond to a local connection identification value in data received by a terminal host.

9. The method of claim 3, including defining an update identification number field in each of said endpoint update and said endpoint update acknowledgment data, and incrementing the identification number field for each subsequent endpoint update data a network terminal host transmits to a peer.

10. The method of claim 1, including affiliating the mobile T/H with the network base stations by using radio channels over which the mobile T/H transmits and receives network data.

11. The method of claim 1, including assigning addresses to terminal hosts of the communications network conforming to an Internet protocol.

12. The method of claim 1, including linking the mobile T/H with both of the first and the second network base stations for a determined time period thus allowing the mobile T/H to receive data addressed to the mobile T/H which data was transmitted earlier to the first network base station.

* * * * *